Aug. 24, 1954
H. R. GREENLEE
2,687,198
CLUTCH
Filed Aug. 3, 1950
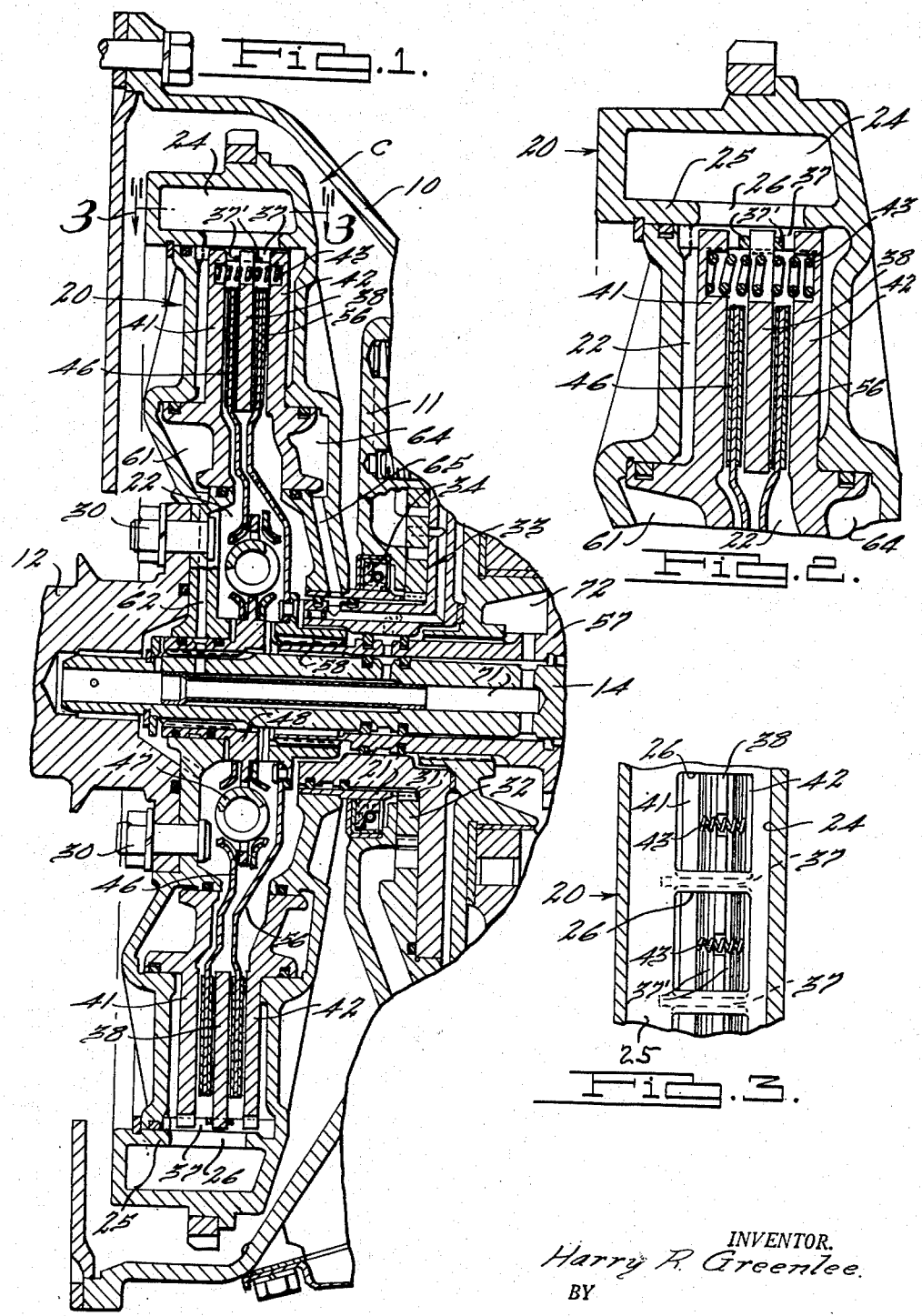
INVENTOR.
Harry R. Greenlee.
BY
Harness and Harris
ATTORNEYS.

Patented Aug. 24, 1954

2,687,198

UNITED STATES PATENT OFFICE 2,687,198

CLUTCH

Harry R. Greenlee, Detroit, Mich., assignor to Chrysler Corporation, Highland Park, Mich., a corporation of Delaware Application August 3, 1950, Serial No. 177,489

3 Claims. (Cl. 192—113)

This invention relates to disc-type friction clutches or the like that are adapted for so-called "wet" operation. More particularly, this invention relates to novel means for eliminating so-called "viscous drag" or "oil drag" in disc clutches of the "wet" type. The novel clutch construction herein disclosed provides a fluid storage chamber around the outer periphery of the substantially hollow clutch casing such that the fluid that tends to collect on and about the clutch disc friction surfaces, primarily during periods of non-rotation of the clutch, may be readily discharged into the peripherally arranged fluid storage chamber on initiation of rotation of the clutch casing. By providing means for immediately removing the clutch casing contained fluid from the area adjacent the clutch disc friction surfaces, on initial rotation of the clutch casing, the possibility of the casing contained fluid transmitting drive, at a time when the clutch is disengaged, is greatly reduced. Thus there is practically no danger of such a clutch transmitting drive at a time when a no-drive condition is desired and intended.

It is a well known fact that disc type "wet" clutches are troubled by so-called "viscous drag" which results from the fact that the fluid that enters the "wet" clutch casing may have such a viscosity that the cohesive and adhesive properties existing between the fluid particles and the submerged, disengaged, clutch elements causes the clutch to transmit drive even though the clutch disc friction surfaces are disengaged. This phenomena of "viscous drag" is most frequently experienced in "wet" clutches at times when the surrounding atmospheric temperature may be relatively low at which time the viscosity of the fluid in the clutch casing is relatively high. Under such conditions the high viscosity fluid surrounding the clutch drive transmitting members tends to drivingly connect these drive transmitting members, even though they be disengaged, and thus a drive may be transmitted through the clutch at a time when the clutch is set for no-drive.

It is thought to be rather obvious that "viscous drag" can provide a number of undesired and rather serious conditions particularly in motor vehicle drive train installations that include a "wet" clutch as a part of the drive train. For instance on starting the vehicle engine the "viscous drag" of the clutch may transmit drive to the rotatable elements of the transmission gear box associated with the clutch even though the clutch friction elements are disengaged. This will interfere with or even prevent manual shifts of the shiftable elements of the transmission gear box due to the inability to meshingly engage certain toothed elements of the gearing during periods of relative rotation of the tooth elements. Accordingly, the desired gear ratio cannot be selected and drive cannot be initiated until after the engine has been run sufficiently to lower the viscosity of the clutch casing contained fluid and thus reduce the "viscous drag" of the clutch. In the event the transmission should be set in a drive transmitting ratio when the engine is started then "viscous drag" can produce an undesired movement or creep of the vehicle at a time when vehicle movement may not be desired. Creep of vehicles is particularly objectionable and even dangerous in vehicles with so-called automatic transmissions due to the fact that these transmissions generally do not include a manually operable clutch pedal. Under such conditions the vehicle brake must be applied whenever the vehicle engine is started in order to insure that the vehicle will not lurch forward or rearwardly in the event the transmission unit is conditioned for a drive transmitting ratio at a time when "viscous drag" may be present.

It is an object of this invention to provide a "wet" clutch construction having means that tends to eliminate "viscous drag" in a clutch of the friction type.

It is a further object of this invention to provide the clutch casing of a "wet" clutch with a fluid storage chamber adapted to receive and store the casing contained fluid in a location where the fluid will be out of contact with the clutch drive transmitting elements.

It is another object of this invention to provide the clutch casing of a "wet" clutch with a peripherally arranged fluid storage chamber that is connected to the main chamber of the clutch casing in such a way that centrifugal action, on initiation of rotation of the clutch casing, will transfer the fluid in the main chamber of the clutch casing to the peripherally arranged storage chamber and thereby tend to prevent "viscous drag" between the driving and driven elements of the clutch.

It is still a further object of this invention to arrange the fluid storage chamber of the clutch casing such that the fluid therein will tend to flow across and lubricate the elements of the clutch mechanism whenever the clutch casing is brought to a standstill.

Other objects and advantages of this invention will become apparent from a reading of the attached description and a consideration of the related drawings wherein:

Fig. 1 is a sectional elevational view of a portion of a drive train including a clutch construction embodying this invention;

Fig. 2 is an enlarged, fragmentary, sectional elevational view of a portion of the clutch structure disclosed in Fig. 1; and Fig. 3 is a fragmentary sectional elevational view taken along the line 3—3 of Fig. 1 looking in the direction indicated.

The portion of the drive train embodying the invention shown in the drawings could be any motor vehicle drive train or the like that has a transmission housing 10 that encloses the adjacent ends of the axially aligned driving and driven shafts 12 and 14 respectively. The clutch mechanism C, incorporating this invention, is of the so-called "wet" type and is adapted to drivingly connect the adjacent ends of the driving and driven shafts 12 and 14. Clutch C includes an outer, annular, substantially hollow, drum-like casing 20. Casing 20 has an interiorly disposed, annular, slotted, wall 25 that provides the casing interior with a main chamber 22 adapted to receive the clutch drive transmitting mechanism, and a peripherally arranged fluid storage chamber 24. Main chamber 22 is connected to the storage chamber 24 by the spaced, circumferentially extending, radially directed, slots 26 in the wall 25. Fluid that enters the casing 20 through seal leakages or by any other means may pass between the chambers 22 and 24 due to the slotted connections 26 therebetween.

The input or driving shaft 12 is drivingly connected to the clutch casing 20 by the bolt and nut connecting means 30. At the side of the clutch casing 20 opposite its connection to the driving shaft 12, the casing 20 is provided with any axially extending, sleeve-like journal 21. Journal 21 has the rearwardly extending end portion thereof drivingly connected at 31 to the driving gear 32 of the gear type oil pump 33. Oil pump 33 is adapted to provide pressurized fluid for actuation of the pistons 41, 42 of the clutch mechanism C and to also provide pressurized fluid for lubrication of the several relatively movable elements of the clutch mechanism and associated elements of the drive train. A seal 34 extends between the sleeve-like journal 21 of the clutch casing 20 and the wall 11 of the transmission housing 10.

Mounted within the main chamber 22 of the clutch casing 20 and drivingly connected thereto by the rib 37 and snap rings 37' is a radially extending clutch reaction or drive transmitting plate 38. The reaction plate 38 is staked to the housing 20 by the snap rings 37' so as to be held against axial movement relative thereto. Also mounted within and drivingly connected to the clutch casing 20 are the pair of opposed, axially shiftable, pressure fluid actuated pistons 41 and 42 respectively. Pistons 41 and 42 are adapted to be selectively engaged with the opposite sides of the reaction plate 38 through the friction discs 46, 56 respectively. Compression type spring means 43 normally urge pistons 41 and 42 away from the reaction plate 38.

Mounted between the piston 41 and the reaction plate 38 is the friction surfaced, drive transmitting clutch disc 46. Disc 46 is drivingly connected through the vibration damping mechanism 47 and its hub member 48 to the aforementioned driven or output shaft 14. The rearward movement of driving piston 41 is adapted to clampingly engage the driven clutch disc 46 between the reaction plate 38 and piston 41 to provide a means for the transmission of a positive drive from the input shaft 12 through clutch C and shaft 14, to the remainder of the drive train associated therewith.

Also mounted within clutch casing 20 and located between the reaction plate 38 and the other axially shiftable piston 42 is a second friction surfaced, drive transmitting clutch disc 56. Drive transmitting clutch disc 56 is drivingly connected to a second driven or output shaft 57 by means of the hub member 58. The forward movement of driving piston 42 is adapted to clampingly engage the driven disc 56 between the reaction plate 38 and the piston 42 to provide a means for transmitting another friction drive, such as a reverse drive or the like, from the input shaft 12, through the clutch C and shaft 57 to the remainder of the drive train associated therewith.

Pressure fluid for the actuation of piston 41 is supplied to the cylinder 61 from pump 33 through conduit 62. Pressure fluid for the actuation of piston 42 is supplied to the cylinder 64 from pump 33 through conduit 65.

The clutch mechanism C herein disclosed is so designed that the fluid that enters the clutch casing 20, when the casing is not rotating, can only fill the lower portion of the casing 20 to about the level of the bore 71 in the shaft 14. Bore 71 is arranged to provide a drain conduit for returning the fluid deposited in clutch casing 20 to the inlet 72 of the supply sump (not shown) for the pump 33. As it is possible to fill substantially only the lower half of the casing 20 with fluid, it is only this relatively small quantity of fluid that need be removed from the space within the chamber 22 adjacent the engageable friction surfaces of the clutch drive transmitting discs 46, 56 in order to prevent "viscous drag" when rotation of the casing 20 is initiated. It will be noted that a large portion of the space within main chamber 22 of the clutch casing 20 is occupied by the clutch mechanism elements therefore the unoccupied space in chamber 22 that can be filled with fluid is relatively small. The volume of the fluid storage chamber 24 is designed so as to provide adequate storage space for all fluid that may drain into and be retained within the casing 20 during periods of non-rotation of the clutch casing. Immediately on initiating rotation of the clutch casing 20 the fluid contained therein will be discharged by centrifugal force from the main casing chamber 22 through slots 26 in wall 25 into the peripherally disposed storage chamber 24 of casing 20. This removal of the fluid from chamber 22 on rotation of casing 20 will reduce the possibility of the fluid within the casing 20 being located in such a position that it might provide a drive transmitting medium to drivingly connect the disengaged pistons 41, 42, the reaction plate 38 and the drive transmitting discs 46, 56 on initiation of rotation of casing 20. From the above it is thought to be obvious that the volume of the fluid storage chamber 24 need only be equal to approximately the unoccupied volume of the main chamber 22 in order to insure complete removal of the fluid from the main chamber 22 on initiation of rotation of the casing 20.

In addition to reducing the tendencies for viscous drag in a "wet" clutch, the casing construction herein disclosed has other advantages. One of these additional advantages is that the fluid admitted to the clutch casing will normally tend to lubricate the elements of the clutch mechanism everytime the clutch housing is brought to a standstill. This automatic, flow-type, lubricating system reduces wear of the clutch elements, insures smooth clutch operation and reduces the cost of the clutch due to the fact that separate clutch lubricating means may be eliminated. The clutch lubricating system herein referred to results from the fact that the casing contained fluid thrown into the storage chamber 24 during rotation of clutch casing 20 drains back into main chamber 22 through the slots 26 in wall 25 when the clutch casing is brought to rest. In draining back into the main chamber 22 the fluid from chamber 24 will flow across the clutch mechanism elements and coat the clutch elements with a film of lubricant so that they will be continuously conditioned for best operation.

From the above description of the disclosed clutch mechanism embodying this invention, it is thought to be obvious that this clutch housing arrangement provides a means that automatically tends to eliminate "viscous drag" in a "wet" clutch without materially increasing the size, cost or complexity of the clutch mechanism. In addition to providing a means for preventing "viscous drag" in a "wet" clutch, the arrangement herein disclosed tends to provide an automatically operable, flow-type lubrication system for the clutch mechanism that improves the life and operation of the clutch mechanism.

I claim:

1. A clutch mechanism adapted to drivingly connect a pair of input and output members comprising an annular, drum-like casing enclosing adjacent portions of said members and drivingly connected to one of said members, said casing having an integral interiorly disposed, annular, slotted wall that provides the casing with an interior, centrally disposed, main chamber and an interior, peripherally disposed, fluid storage chamber extending concentrically about said main chamber and in continuous, direct communication therewith by means of the slot-like openings in said wall, said slot-like openings providing for removal of fluid from the main chamber by centrifugal force, a radially extending clutch reaction member drivingly connected to said casing having portions thereof disposed completely within said main chamber, a radially extending clutch drive transmitting member drivingly connected to the other of said shafts and located completely within the main chamber of said casing having portions thereof arranged for frictional engagement with said reaction member, and pressure fluid operated clutch actuation means for effecting engagement of said drive transmitting member and said reaction member located within said main chamber, the volume of said fluid storage chamber being substantially equal to or greater than one-half the unoccupied volume of said main chamber.

2. A clutch mechanism adapted to drivingly connect a pair of input and output members comprising an annular, drum-like casing enclosing adjacent portions of said members and drivingly connected to one of said members, said casing having an integral, interiorly disposed, annular, slotted wall that provides the casing with an inner, centrally disposed, main chamber and an interconnected, peripherally disposed, fluid storage chamber extending concentrically about said main chamber and in continuous, direct communication therewith by means of the slot-like openings in said wall, said slot-like openings in said wall providing for removal of fluid from the main chamber by centrifugal force, a radially extending clutch reaction member drivingly connected to said casing having portions thereof disposed completely within said main chamber, a radially extending clutch drive transmitting member drivingly connected to the other of said shafts and located completely within the main chamber of said casing having portions thereof arranged for frictional engagement with said reaction member, pressure fluid operated clutch actuation means for effecting engagement of said drive transmitting member and said reaction member located within said main chamber, the volume of said peripherally disposed fluid storage chamber being substantially equal to or greater than the unoccupied volume of said main chamber, and conduit means connected to the main chamber adapted to provide fluid drainage means for said main chamber when the fluid admitted to said main chamber has reached a predetermined volume.

3. A clutch mechanism adapted to drivingly connect a pair of axially aligned input and output shafts comprising a drum-like, substantially hollow casing enclosing adjacent portions of said shafts and drivingly connected to one of said shafts, said casing having an annular, integral, interiorly disposed, concentrically arranged wall providing the casing interior with an inner centrally disposed main chamber and an outer, wall separated, peripherally disposed, fluid storage chamber that extends concentrically about said main chamber, circumferentially spaced, radially extending, passages through said interiorly disposed wall directly and continuously connecting said chambers and providing means for the removal of fluid from the main chamber by centrifugal force on rotation of the clutch mechanism, a radially extending reaction member drivingly connected to said interiorly disposed wall having portions thereof located within said main chamber, a radially extending drive transmitting member drivingly connected to the other of said shafts and located within the main chamber of said casing, said drive transmitting member having portions arranged for engagement with said reaction member, pressure fluid operated actuation means for effecting engagement of said drive transmitting member and said reaction plate drivingly connected to and located within said main chamber, and a fluid bleed bore extending axially of one of said shafts and connected to said main chamber to provide a means for draining off and limiting the quantity of fluid that may normally be deposited in said clutch casing, the volume of said fluid storage chamber being equal to or greater than the unfilled space in said main chamber.

References Cited in the file of this patent

UNITED STATES PATENTS

| Number | Name | Date |
|---|---|---|
| 690,641 | Davis | Jan. 7, 1902 |
| 814,132 | Hele-Shaw | Mar. 6, 1906 |
| 986,324 | Brown | Mar. 7, 1911 |
| 2,150,950 | Thoma | Mar. 21, 1939 |
| 2,183,761 | Aspinwall | Dec. 19, 1939 |
| 2,407,699 | Hill | Sept. 17, 1946 |

FOREIGN PATENTS

| Number | Country | Date |
|---|---|---|
| 374,012 | France | June 3, 1907 |
| 579,061 | Germany | June 21, 1933 |